United States Patent Office

2,802,038
Patented Aug. 6, 1957

2,802,038

CONDENSATION OF ACETYLENE WITH AROMATIC HYDROCARBONS

Erhard J. Prill, Dayton, Ohio, assignor to Monsanto Chemical Company, St. Louis, Mo., a corporation of Delaware No Drawing. Application May 20, 1953,
Serial No. 356,320

16 Claims. (Cl. 260—668)

This invention relates to the manufacture of diarylethanes. In specific aspects the invention pertains to new catalysts for the manufacture of 1,1-diarylethanes by condensation of acetylene with aromatic hydrocarbons from the group consisting of alkylbenzenes and condensed ring aromatics.

Diarylethanes can be pyrolyzed to produce vinylaryl compounds which of course have great interest as monomers in the plastics and rubber industries. Only a few catalysts have heretofore been known for use in the manufacture of diarylethanes by condensation of aromatic hydrocarbons with acetylene. It is apparent that the provision of new catalysts for this reaction would be of importance. Sulfuric acid containing mercuric ions is an efficient catalyst for the reaction, but is so active that refrigeration is required with consequent expense and inconvenience, and even then sulfonation may occur to an undesired extent.

An object of this invention is to produce diarylethanes. Another object of the invention is to provide new catalysts for the condensation of acetylene with alkylbenzenes. A further object is to provide new catalysts for the condensation of acetylene with condensed ring aromatic hydrocarbons, especially naphthalene and alkylnaphthalenes. Yet another object is to provide a method for manufacturing 1,1-dixylylethane. A still further object is to provide catalysts for the described condensations that are sufficiently active to give good yields of diarylethane yet not so active as to require refrigeration. Another object is to effect the described condensation without sulfonation. Further objects and advantages of the invention will be apparent to those skilled in the art from the accompanying disclosure and discussion.

In accordance with the present invention, in preferred aspects, the condensation of acetylene with an aromatic hydrocarbon selected from the group consisting of alkylbenzenes and condensed ring aromatic hydrocarbons is effected in the presence of a catalyst comprising an alkanesulfonic acid containing mercuric ions. Use of such catalysts results in the selective formation of 1,1-diarylethanes wherein the aryl groups correspond to the aromatic hydrocarbon reacted.

Methanesulfonic acid is a preferred catalyst. A group of alkanesulfonic acids generally used includes those containing from 1 to 4 carbon atoms in the molecule. Individual alkanesulfonic acids, or mixtures thereof, can be employed. Alkanesulfonic acids having more than 4 carbon atoms per molecule, say, up to 6 or 8 or more carbon atoms per molecule, can be employed if desired. The higher alkanesulfonic acids are highly soluble in the aromatic hydrocarbon reactants. This has the advantage of providing a homogeneous reaction mixture with intimate contact of catalyst with reactants but the disadvantage that catalyst cannot be separated from hydrocarbons by simple phase separation. However, by addition of water the alkanesulfonic acid can be separated from the hydrocarbon reaction mixture. Alkanesulfonic acid thus separated, as well as alkanesulfonic acid that is sufficiently insoluble in the hydrocarbon reaction mixture to exist as a separate phase and is recovered by phase separation, can be purified by removing water therefrom by distillation. Such purified alkanesulfonic acid can then be reused in the process. Due to build up of organic impurities in the catalyst, a portion of the catalyst must be removed and replenished with fresh acid to maintain suitable acid strength. In carrying out the reaction, it is preferred to employ alkanesulfonic acid having at least a 95 weight percent content of alkanesulfonic acid, the balance being other organic matter and/or water. However, somewhat weaker alkanesulfonic acid can be used with more reactive hydrocarbons and/or at higher temperatures and high acetylene pressures.

The quantity of mercuric ion should be below 2 weight percent of the acid for the sake of economy, although larger amounts can be used. In this specification and claims, when quantity of mercuric ion is given as weight percent, it is to be understood that it is calculated on the basis of weight percent mercuric sulfate. Usually 1 weight percent is adequate and even smaller amounts, e. g., down to 0.5 weight percent are often satisfactory. Mercuric ion can be provided in the form of mercuric sulfate or other mercuric compounds that have some solubility in the acid, in weights that will be equivalent to the stated numerical values when calculated as mercuric sulfate. Thus, instead of mercuric sulfate one can use mercuric oxide, mercuric phosphate, mercuric acetate, mercuric chloride or even a mercurous compound in the presence of an added oxidizing agent such as ferric sulfate that will result in mercuric ions.

I ordinarily prefer to employ my catalysts in liquid form, providing sufficient agitation to result in intimate contact between hydrocarbon reactants and catalyst. However, solid form catalysts are sometimes advantageous. They can be made by incorporating the alkanesulfonic acid plus mercuric ion with a solid particulate carrier material, such as clay, alumina, silica gel, etc., having extended surface area. Solid catalysts are best used by maintaining a stationary bed of catalyst particles in a catalyst chamber through which the reaction mixture is passed at suitable conditions of temperature, pressure, and contact time. With liquid catalysts, the catalyst and hydrocarbon reactants can be forced through a reaction zone under conditions providing intimate contact. Suitable apparatus can be a reaction vessel having an efficient stirrer therein, or can be an elongated tube of sufficiently small cross section and/or with such convolutions as to cause, under the conditions of use, turbulent flow and mixing of the ingredients of the reaction mixture. The reaction can be carried out in batchwise manner but for commercial practice it is preferred to effect the reaction continuously. In the case of liquid catalysts, if possible a phase separation is made of the final reaction mixture into catalyst phase and organic phase and the former is recycled to the reaction. Naturally there is some spending of catalyst, and any of the well-known procedures can be used for purifying and/or fortifying catalyst and maintaining it at desired strength. Adequate means should be provided in all cases for removal of the exothermic heat of reaction.

A suitable quantity of catalyst in a particular situation can be chosen by those skilled in the art. Sufficient catalyst should be used to permit efficient dispersion of catalyst with hydrocarbons. Ordinarily the liquid volume of catalyst should be at least 0.3 volume per 1 volume of aromatic hydrocarbon charged. It is preferred that the ratio of liquid volume of catalyst to liquid volume of aromatic hydrocarbon charged be at least 0.4:1. In some instances it may be advantageous to use as much as 1 volume of catalyst per volume of hydrocarbon. In the case of solid catalysts the same criterion can be used, considering the volume of the solid rather than volume of liquid catalyst. Where reactants are passed through a body of solid catalyst, or through a body of liquid catalyst that remains essentially within a single reaction vessel while hydrocarbon passes therethrough, the rate of flow of reactants will, of course, be chosen to give the desired extent of reaction, and a contact time of from 1 to 30 minutes and occasionally longer will be customary. For a strictly batch reaction, reaction times of from 1 to 5 hours will ordinarily be used, the principal limitation on time being the ability of the particular system to absorb acetylene and dispose of the exothermic heat of reaction.

The reaction is generally applicable to aromatic hydrocarbons selected from the group consisting of alkylbenzenes and condensed ring aromatics. The term "condensed ring aromatics" includes unsubstituted condensed ring aromatic hydrocarbons and alkylated derivatives thereof. Preferably used are the alkylbenzenes, both mono- and polyalkylbenzenes and particularly mono- and dialkylbenzenes. As examples of condensed ring aromatic hydrocarbons that are particularly desirable can be mentioned naphthalene, mono-, di- and tri- and higher alkylnaphthalenes. When the aromatic hydrocarbon is normally solid at the reaction temperature, a suitable solvent can be used, e. g., hexane, benzene or chlorobenzene. By way of specific example, but not limitation, the following reactants are mentioned: toluene, xylene (either ortho-, para- or metaxylene or mixtures of the same), ethylbenzene, mesitylene, cumene, diethylbenzene, α-methylnaphthalene, 2,4-diethylnaphthalene. It is preferred that the aromatic hydrocarbon reactant contain not over 20 carbon atoms. Those skilled in the art will understand that aromatic hydrocarbons containing non-hydrocarbon groups which do not interfere with the reaction can be employed.

It is desirable that in the final reaction mixture after the completion of the reaction there still be a considerable excess of unreacted aromatic hydrocarbon. Preferably the mole ratio of aromatic hydrocarbon charged to total acetylene charged is at least 3:1, and 4:1 usually gives higher yields. Still higher ratios can be used, but beyond the range of about 4:1 to 6:1, little improvement is obtained in overall yield and the removal of the additional unreacted aromatic hydrocarbon from the final reaction mixture is an added expense. It can be stated that generally a mole ratio of total aromatic hydrocarbon charged to total acetylene charged should be within the range of 3:1 to 8:1 and preferably within the range of 4:1 to 6:1. As indicated herein, the acetylene is best introduced in a gradual manner by suitable means so that the instantaneous concentration of acetylene in the reaction mixture is quite low. The reaction time of course will depend greatly upon the rate of removal of heat of reaction from the system, but in a simple well-agitated batch reaction with good heat exchange a reaction time of 2 to 3 hours is ordinarily adequate.

It will be appreciated that the various catalysts that can be used in accordance with the present invention will differ appreciably among themselves as to catalytic activity, and also the catalytic activity will be dependent to some extent upon the quantity of mercuric ion, the strength of the acid, etc. Naturally the more active the catalyst composition the lower the temperature and pressure permissible for adequate rate of reaction. Furthermore, rate of reaction is dependent upon the particular aromatic hydrocarbon employed, as well as the ratio of aromatic hydrocarbon to acetylene in the reaction mixture. Thus, reactants, catalysts, temperature, pressure, degree of agitation, and contact time are all interrelated variables. Those skilled in the art, having had the benefit of the present disclosure, will readily select a combination of these variables to give the desired results.

Atmospheric pressure is ordinarily adequate for carrying out the reaction. However, low superatmospheric pressures are often convenient. With increased pressures, it is often desirable, especially to avoid explosive concentrations of acetylene, to use also an inert gas, e. g., nitrogen, $CO_2$, or inert gases present in commercial acetylene-containing gases. There is no particular pressure limitation other than that dictated by reasons of safety. A total pressure of 500 pounds per square inch will be quite sufficient for most purposes. The art has already been sufficiently informed of the techniques necessary for safe handling of acetylene in carrying out chemical reactions, that it is not considered necessary to do more here than to indicate that suitable pressures should be used and indicate conditions that are preferred with respect to the carrying out of the present invention. An advantage of my catalysts is that they are active at atmospheric pressure, thus obviating the necessity of pressure equipment and the possible dangers of employing acetylene under super-atmospheric pressure. Furthermore, the sulfonation that occurs with sulfuric acid catalyst does not occur to an important extent with alkanesulfonic acid catalysts.

Elevated temperatures should be used. Here again the temperature chosen will be related to the other reaction conditions, reactivity of the particular aromatic hydrocarbon being used, etc., lower temperature being used with higher pressures, more active catalysts and more reactive aromatic hydrocarbons. In most instances, temperatures within the range of 40° C. to 120° C. are adequate. From 60° C. to 100° C. is a preferred temperature range.

The following examples are presented to illustrate some combinations of reactants, catalysts, and reaction conditions suitable for carrying the invention into effect. It will be appreciated that the invention is not limited to the exact combinations set forth therein.

EXAMPLES

In all of the following examples, the apparatus and procedure were as follows. The reactor consisted of a 2-liter, 4-necked flask fitted with an efficient stirrer, thermometer, gas inlet tube (above the surface of liquid), and gas outlet tube connected to a gas flow indicator. The reaction flask was charged with the chosen quantity of alkanesulfonic acid, powdered mercuric sulfate, and meta-xylene reactant. Addition of gaseous acetylene to the rapidly agitated mixture was begun when the reactor temperature had been adjusted to the desired value. The acetylene flow was adjusted to permit addition of 1 mole acetylene in approximately 2 to 4 hours. All of the acetylene was absorbed. Stirring was continued for an additional 10 to 30 minutes after acetylene flow was terminated.

Water was added to the reaction mixture and the resulting aqueous acid and organic layer were separated from each other. The latter was washed with an aqueous solution of sodium chloride containing sodium carbonate or bicarbonate. The washed oil layer was then fractionally distilled under reduced pressure in an 18-inch Vigreux column.

In each of runs A, B, and C, the catalyst consisted of 300 grams mixed alkanesulfonic acid plus 5 grams $HgSO_4$. The mixed alkanesulfonic acid constituted a mixture of methanesulfonic acid, ethanesulfonic acid and propanesulfonic acid, with the average molecular weight being in the neighborhood of ethanesulfonic acid. This was a commercial mixture and contained small quantities of free sulfuric acid.

In run D, the catalyst consisted of 300 grams methanesulfonic acid plus 5 grams $HgSO_4$.

Amounts of reactants, reaction conditions and product recoveries are given in the following table.

*1,1-dixylylethane production by condensation of xylene with acetylene alkanesulfonic acid catalysts*

| Run No. | $C_2H_2$ | | m-Xylene | | Catalyst | Temp., °C. | Time of Add'n (Hrs.) | Xylene Recovered | | 1,1-Dixylylethane | | Wt. Percent Yield | |
|---|---|---|---|---|---|---|---|---|---|---|---|---|---|
| | g. | Moles | g. | Moles | | | | g. | Moles | g. | Moles | on $C_2H_2$ | on Xylene |
| A | 30.0 | 1.15 | 424 | 4.4 | Mixed alkanesulfonic acids. | 60 | 2.25 | 258 | 2.43 | 128.3 | 0.540 | 46.7 | 69.0 |
| B | 28.0 | 1.08 | 424 | 4.0 | ___do___ | 80 | 2.25 | 295 | 2.78 | 62.8 | 0.264 | 21.0 | 43.0 |
| C | 34.0 | 1.31 | 636 | 6.0 | ___do___ | 95–9 | 3.3 | 424 | 4.00 | 181.0 | 0.76 | 58.2 | 77.1 |
| D | 31.0 | 1.19 | 424 | 4.0 | Methanesulfonic acid | 70–5 | 3.5 | 166 | 1.57 | 209.5 | 0.88 | 73.7 | 72.4 |

While the invention has been described herein with particular reference to various preferred embodiments thereof, and examples have been given of suitable proportions and conditions, it will be appreciated that variations from the details given herein can be effected without departing from the invention in its broadest aspects.

What is claimed is:

1. In the condensation of acetylene with an aromatic hydrocarbon selected from the group consisting of alkylbenzenes and condensed ring aromatics to form diarylethanes, the improvement which comprises employing as catalyst an alkanesulfonic acid containing mercuric ions.

2. In the condensation of acetylene with an alkylbenzene to form a corresponding diarylethane, the improvement which comprises employing as catalyst an alkanesulfonic acid containing mercuric ions.

3. In the condensation of acetylene with a condensed ring aromatic hydrocarbon to form a corresponding diarylethane, the improvement which comprises employing as a catalyst an alkanesulfonic acid containing mercuric ions.

4. A process according to claim 2 wherein said alkylbenzene is xylene.

5. A process according to claim 2 wherein said alkylbenzene is toluene.

6. A process according to claim 2 wherein said alkylbenzene is xylene and said alkanesulfonic acid is methanesulfonic acid.

7. A process according to claim 1 wherein said alkanesulfonic acid contains from 1 to 4 carbon atoms per molecule.

8. A process according to claim 2 wherein said alkanesulfonic acid contains from 1 to 4 carbon atoms per molecule.

9. A process according to claim 1 wherein said alkanesulfonic acid contains less than 2 weight percent mercuric ions calculated as mercuric sulfate.

10. A process according to claim 1 wherein said alkanesulfonic acid is methanesulfonic acid.

11. A process for forming 1,1-diarylethane which comprises subjecting an aromatic hydrocarbon selected from the group consisting of alkylbenzenes and condensed ring aromatics to contact with acetylene in the presence of catalytic amounts of an alkanesulfonic acid having from 1 to 4 carbon atoms per molecule and containing mercuric ions.

12. A process according to claim 11 wherein a temperature of from 40° C. to 120° C. is employed.

13. A process according to claim 11 wherein the mole ratio of aromatic hydrocarbon charged to total acetylene charged is at least 3:1.

14. A process according to claim 11 wherein said aromatic hydrocarbon is xylene.

15. A process according to claim 11 wherein said aromatic hydrocarbon is toluene.

16. A process which comprises reacting acetylene with an aromatic hydrocarbon selected from the group consisting of alkylbenzenes and condensed ring aromatics, employing a mole ratio of aromatic hydrocarbon charged to total acetylene of at least 3:1, at a temperature within the range of 60° C. to 100° C., in the presence of catalytic amounts of an alkanesulfonic acid having from 1 to 4 carbon atoms per molecule and containing a small but effective quantity of mercuric ions.

References Cited in the file of this patent

UNITED STATES PATENTS

| | | |
|---|---|---|
| 2,564,077 | Proell | Aug. 14, 1951 |
| 2,734,928 | Smolin | Feb. 14, 1956 |

OTHER REFERENCES

Reichert et al.: Chem. Abst., vol. 18, page 20006, 1924 (J. Amer. Chem. Soc., vol. 45, 1923, pages 3090–1).

Textbook of Organic Chem., (Wertheim), publ. by Blakiston Co., Phila., Pa., 1945, 2nd ed., page 413 relied on.